Figure 1:
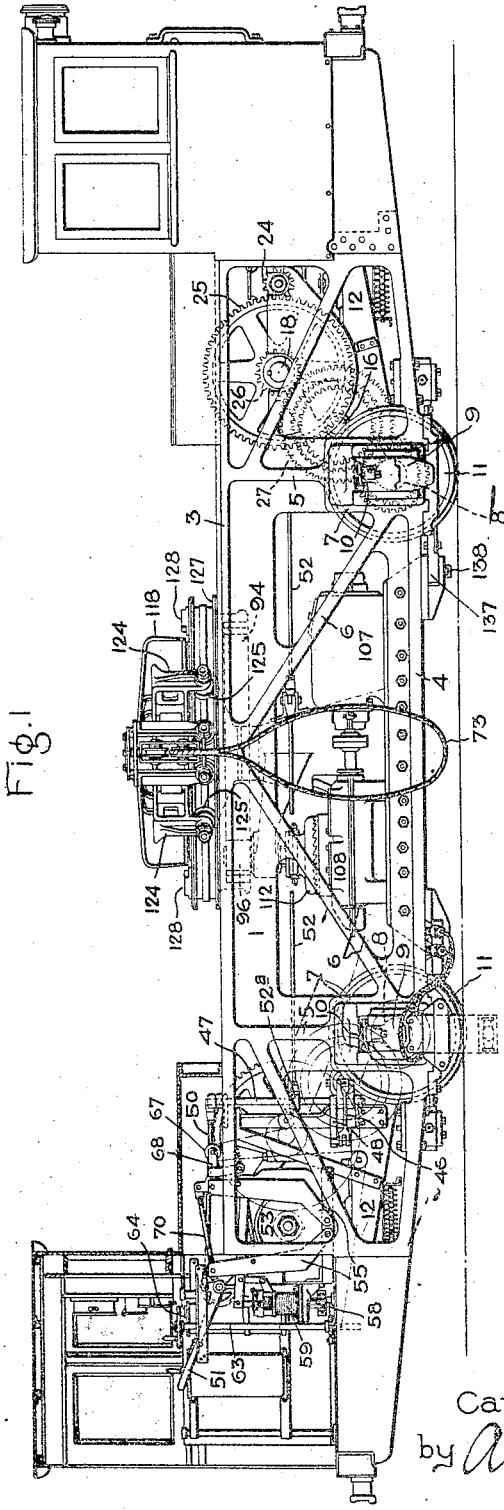

C. W. LARSON.
ELECTRIC TOWING LOCOMOTIVE.
APPLICATION FILED OCT. 28, 1914.

1,177,421.

Patented Mar. 28, 1916.
7 SHEETS—SHEET 3.

Witnesses:

Inventor:
Carl W. Larson,
His Attorney

C. W. LARSON.
ELECTRIC TOWING LOCOMOTIVE.
APPLICATION FILED OCT. 28, 1914.
1,177,421.
Patented Mar. 28, 1916.
7 SHEETS—SHEET 5.
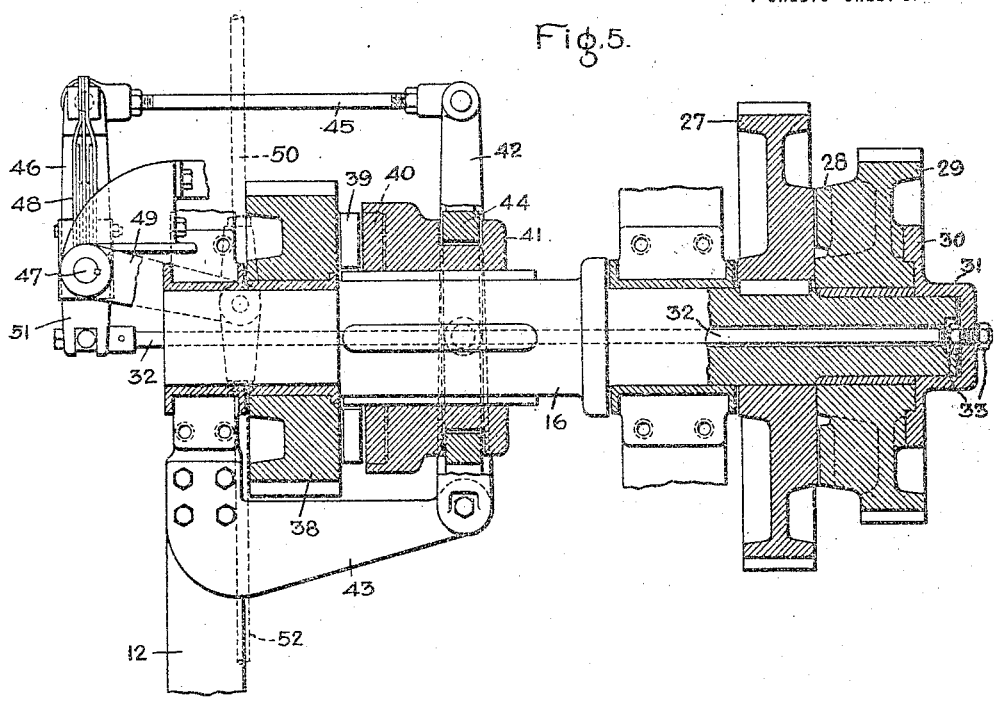
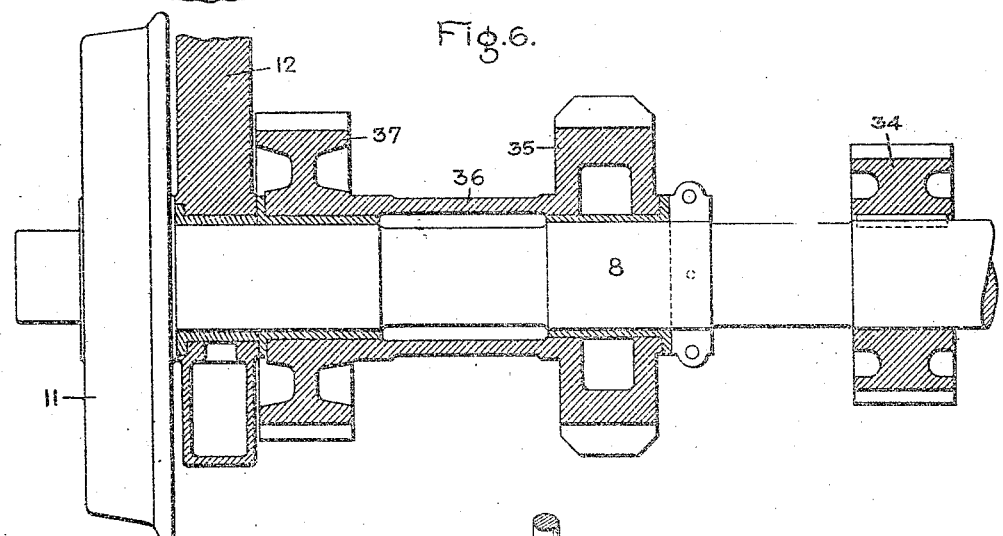
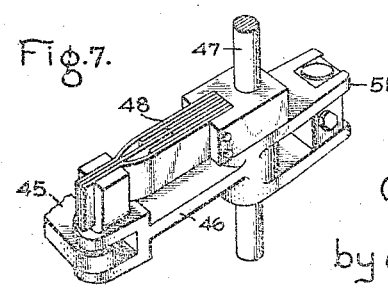
Witnesses:
Inventor:
Carl W. Larson,
by His Attorney

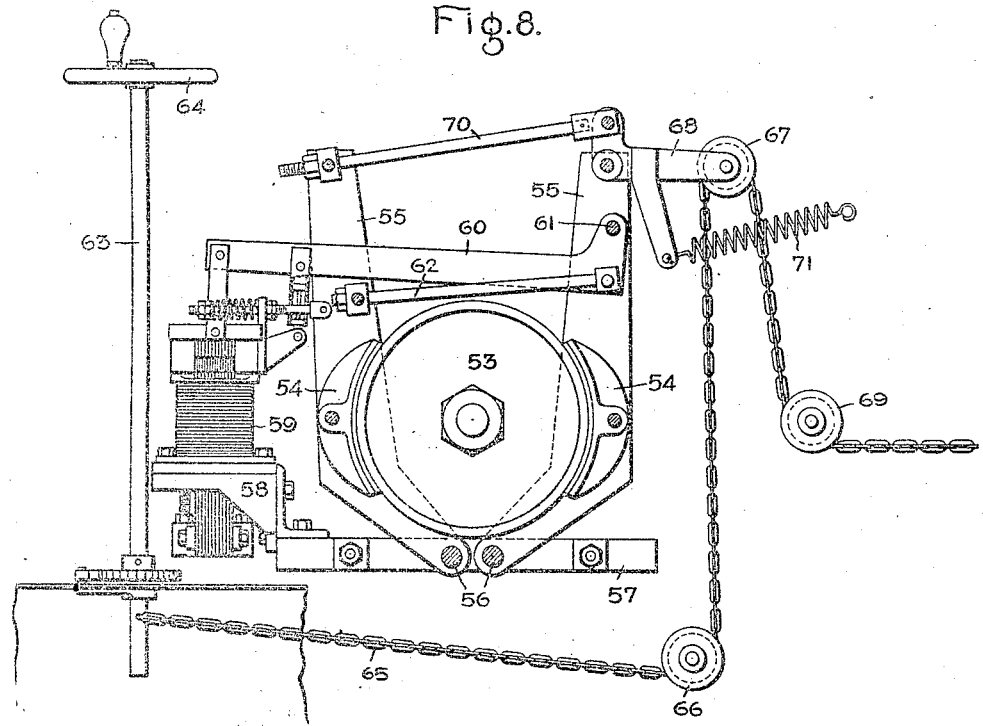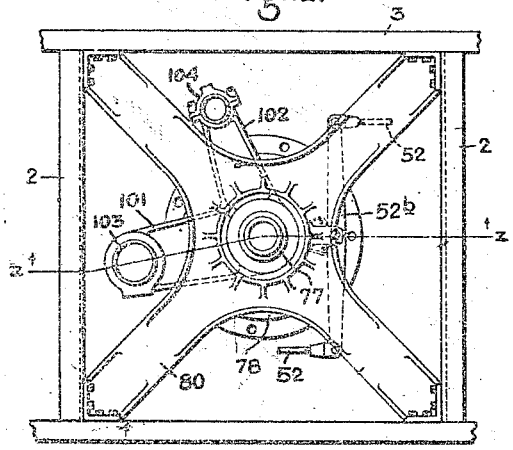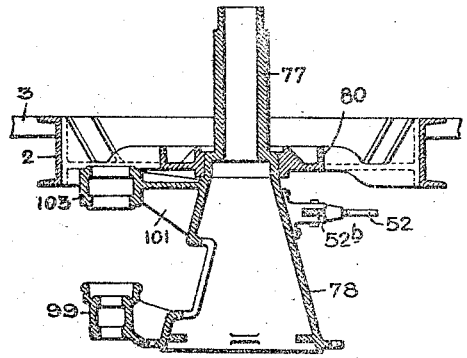

C. W. LARSON.
ELECTRIC TOWING LOCOMOTIVE.
APPLICATION FILED OCT. 28, 1914.
1,177,421.	Patented Mar. 28, 1916.
7 SHEETS—SHEET 7.
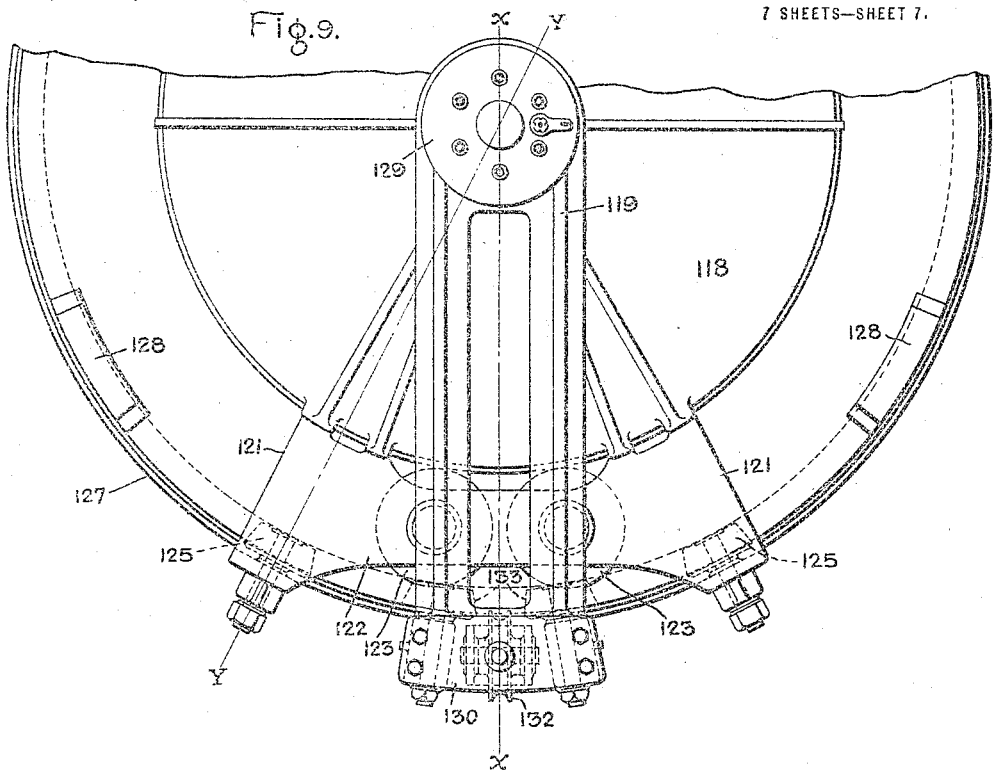
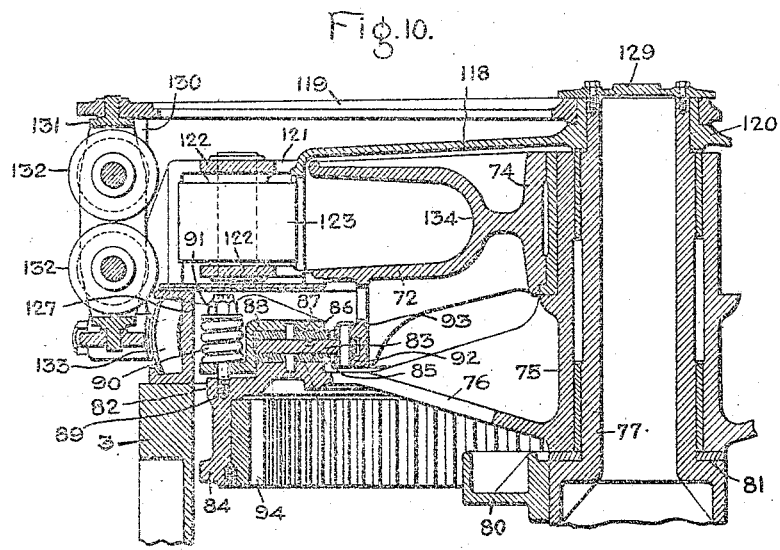
Witnesses:
Inventor:
Carl W. Larson,
by
His Attorney.

UNITED STATES PATENT OFFICE.

CARL W. LARSON, OF SCHENECTADY, NEW YORK, ASSIGNOR TO GENERAL ELECTRIC COMPANY, A CORPORATION OF NEW YORK.

ELECTRIC TOWING-LOCOMOTIVE.

1,177,421.  Specification of Letters Patent.  Patented Mar. 28, 1916.

Application filed October 28, 1914. Serial No. 869,001.

*To all whom it may concern:*

Be it known that I, CARL W. LARSON, a citizen of the United States, residing at Schenectady, in the county of Schenectady, State of New York, have invented certain new and useful Improvements in Electric Towing-Locomotives, of which the following is a specification.

This invention relates to electric locomotives, and especially to those which are used for towing vessels, or for similar service in which the tractive effort of the motors is exerted through a cable wound upon a drum mounted upon the locomotive.

My invention comprises various improvements in the driving mechanism and the brake mechanism, all as hereinafter set forth and claimed.

No claim is made in this application for the winding drum, the details of its mounting upon the frame of the locomotive, or the mechanism for operating said drum, such features of my invention constituting the subject matter of a divisional application, Serial No. 42,550, filed July 29th, 1915.

The locomotive which I have illustrated in the accompanying drawings has been designed and built for service at the Panama Canal for towing vessels into and through the locks; but it is evidently capable of other cognate uses, such for instance, as pulling trains up heavy grades, etc.

The system of towing adopted at the Panama Canal locks utilizes for each vessel four locomotives running along the canal walls, two being opposite each other in advance of the vessel, and two running opposite each other to follow the vessel. Cables extend from the forward locomotives and connect with the port and starboard sides respectively of the vessel near the bow, and other cables connect the rear locomotives with the port and starboard quarters of the vessel.

The lengths of the towing cables are adjusted to position the vessel substantially in mid channel, and when the leading locomotives are started they will tow the vessel, while the trailing locomotives will follow; the speed of all the locomotives being practically the same. Moreover, the towing cables can be adjusted at will during the tow. Thus the vessel is always under complete control quite independently of its own power and the danger of injury to the canal walls and gates is reduced to a minimum. In order to stop the tow, the power is shut off, the forward locomotives drifting and the hand brakes on the trailing locomotives being applied, thus retarding the vessel until it comes to a stop. For such service, the locomotive must have a low center of gravity to reduce the danger of being upset by the lateral pull of the cable. It must also have great tractive power to be able to start and keep in motion the largest vessel which the canal is capable of accommodating. It must be able to ascend the steep grades between the locks. It must have means for slowly paying out or taking in the towing cable during maneuvering and control of the vessel, and means for quickly hauling in the cable when it has been cast off. It must have yielding couplings for the winding drum which will give to prevent the cable from parting in case of an excessive strain. It must have well designed and flexible guiding devices to accommodate for the various angles of the cable. It must have an efficient braking system which will quickly stop the locomotive when desired, and will act automatically in case of a failure of the electric current, so that the vessel will not drift about helplessly, but will be instantly held fast by the four locomotives. My invention aims to provide for all these requirements.

Figure 2:
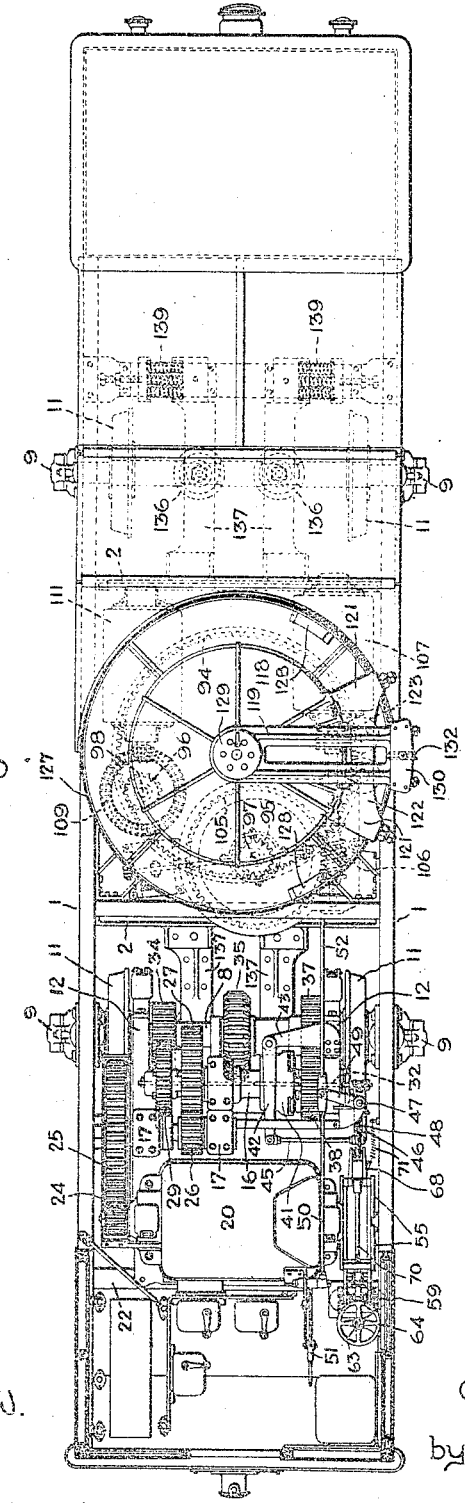
Figure 3:
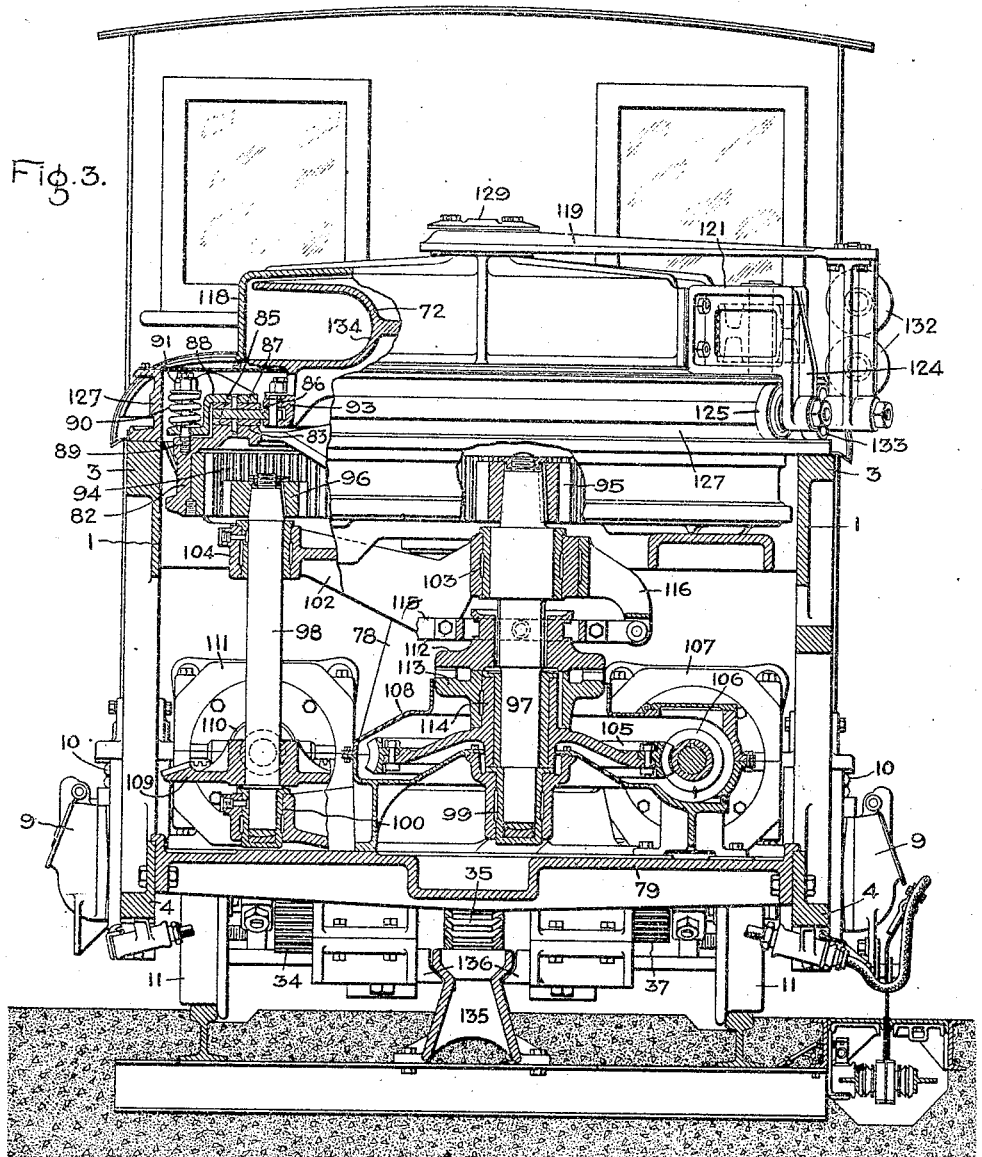
Figure 14:
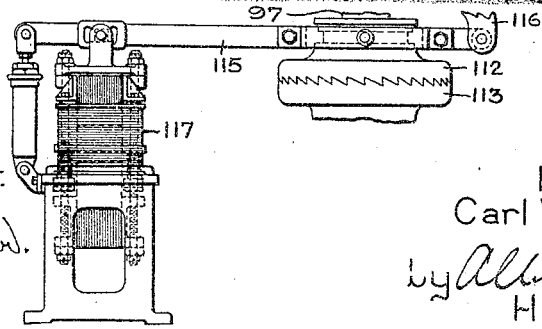
Figure 4:
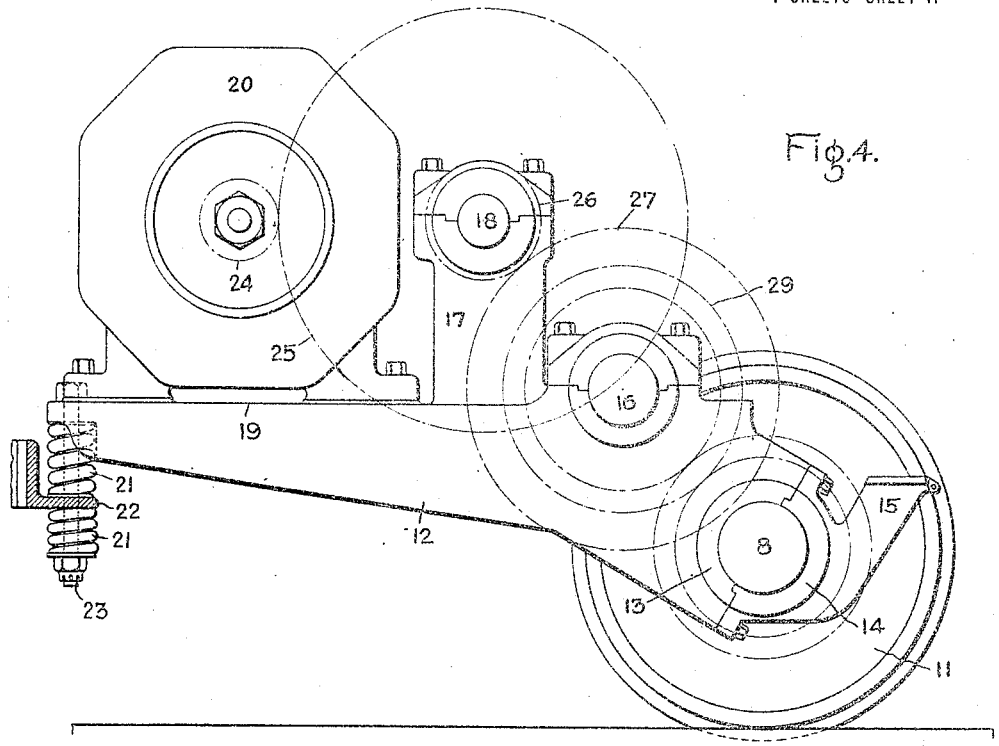
Figure 11:
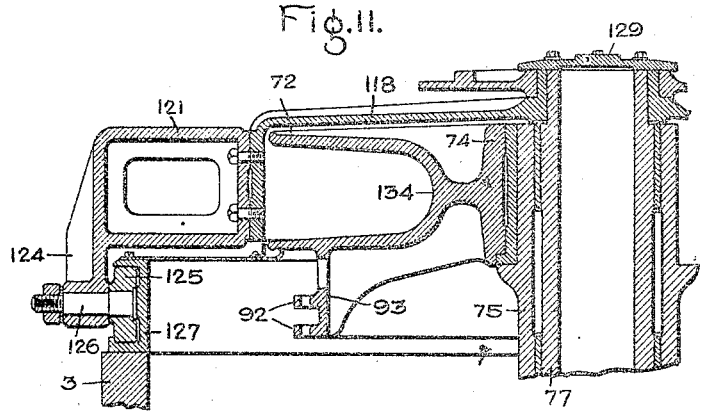

In the accompanying drawings, Figure 1 is a side elevation of my improved towing locomotive with most of the side covers removed; Fig. 2 is a plan view of the same, partly in section: Fig. 3 is a cross-section near the winding drum on a larger scale; Fig. 4 is a side elevation of one of the traction brackets; Fig. 5 is a longitudinal horizontal section of the jack shaft of the driving mechanism; Fig. 6 is a similar section of the axle; Fig. 7 is a detail of the clutch operating mechanism; Fig. 8 is a side elevation, partly in section, of the brake rigging at one end of the locomotive; Fig. 9 is a plan view of the cable guiding devices; Fig. 10 is a cross-section of the same on the line $x-x$, Fig. 9; Fig. 11 is another cross-section of the same on the line $y-y$, Fig. 9; Fig. 12 is a plan view of the pedestal and brace on a smaller scale; Fig. 13 is a vertical section of the same on the line $z-z$, Fig. 12; and Fig. 14 is a detail showing the clutch and operating parts for the slow speed winding motor.

The working parts of the locomotive are supported by two longitudinal upright side frames 1 of cast steel connected by transverse beams 2. The frames are in effect deep rigid trusses, having upper and lower members 3, 4 connected by posts 5 and diagonal braces 6. The middle portion of each frame has its upper and lower members parallel and horizontal, but the end portions have their lower members inclined upwardly toward the ends of the frame. The pedestals 7 for the wheel axles 8 are located at the junction of these end portions with the middle portion, and are of the usual locomotive type, having vertical parallel jaws between which slide the journal boxes 9. Springs 10 are interposed between the tops of the journal boxes and the tops of the pedestals. The locomotive is thus mounted upon four wheels 11 carried on the two axles 8, the wheel base being, in the locomotive selected for illustration, about twelve feet, and the overall length of the locomotive over thirty-two feet.

Each axle is driven by its own motor, independently of the other, and as the construction is identical at both ends of the machine, a description of one will suffice for both.

A bracket 12 is hinged at one end upon the axle, having bearings 13 which fit journals on the axle and are secured in place by caps 14 which are preferably provided with oil cellars 15. The bracket is provided with bearings for a transverse jack shaft 16 parallel with the axle, and has pillow blocks 17 for a counter-shaft 18, also parallel with the axle. It has a substantially horizontal platform 19 to support the driving motor 20. Its outer end is supported at each corner by two springs 21 placed above and below a stationary angle iron 22 and connected to the bracket by a bolt 23 so as to afford a yielding support in both upward and downward movements of the bracket.

The motor 20 is of any well known type and is geared by pinion 24 and spur gear 25 to the counter shaft 18, which carries a pinion 26 meshing with a spur gear 27 keyed to the jack shaft 16. On the outer side of this spur gear are formed clutch teeth to coöperate with similar teeth 28 on the adjacent side of a gear 29 which is sleeved upon the jack shaft, and can be slid lengthwise thereon to engage and disengage said clutch teeth. The means for sliding this gear consists preferably of a disk 30 secured to the gear and having a central hub 31 fitting over the end of the jack shaft. A rod 32 runs through a central hole in said shaft and through the center of the hub 31, where it is rotatably secured by nuts 33, which permit the disk to rotate with the wheel but cause it to slide the wheel axially when the rod is reciprocated. A pinion 34 is keyed to the axle 8 and is wide enough to mesh always with the gear 29, so that when the clutch teeth 28 are engaged the motor will propel the locomotive by the adhesion between the wheels 11 and the rails of the track. But when the locomotive reaches one of the inclines between the locks, whose grade may be as much as twenty-five degrees, it becomes necessary to resort to a cog rail system to enable the locomotive to climb the hill. A cog or rack rail is laid between the track rails and the locomotive is provided with a cog wheel 35 secured to or integral with a sleeve 36 which rotates freely on the axle. A gear wheel 37, secured to or integral with this sleeve, meshes with a gear 38 turning loosely on the jack shaft. Clutch teeth 39 on this gear can be engaged by teeth 40 on a clutch 41 which is splined to the jack shaft. A two-armed lever 42, fulcrumed on a bracket 43, straddles the shaft 16 and is pivoted to a collar 44 riding in a groove in the clutch 41. The lever is connected by a link 45 with one end of a lever 46 turning loosely on a vertical rock shaft 47. An elastic arm 48 is keyed to the shaft and engages lugs on the lever 46. The arm 48 is preferably composed of a laminated flat steel spring. A second arm 49 on the shaft is connected by a rod 50 with a handle 51 in the cab of the locomotive. The handle can be locked by a suitable latch and notched quadrant. The other end of the lever 46 is pivotally connected to the rod 32 so as to throw out the clutch 28 when the clutch 40 is thrown in, and vice versa. The quadrant is provided with three notches. With lever in upper position clutch gear 29 is in and clutch 40 is out. In lower position clutch 40 is in and clutch gear 29 is out. In the middle position both clutches are out. It will be appreciated that the clutch jaws are not always in alinement, but due to the flexible arm 48 the lever handle is thrown full stroke and locked in either up or down position. This will put spring arm 48 under tension and when power is applied to the motor, the shaft 16 is revolved thus causing the clutch jaws to come to alinement, and spring arm 48 being under heavy tension will automatically throw the clutches in, without any attention from the operator. The two rock shafts at opposite ends of the locomotive are connected by the rods 52 pivoted to rock arms 52ª on said shafts and to an intermediate lever 52ᵇ fulcrumed on the pedestal supporting the winding drum.

The two motors 20 are controlled by suitable controllers installed in the cabs at the ends of the locomotive, and the circuits are such that both motors can be controlled from either cab, and can be operated in series or in multiple as desired. Current may be taken from a working conductor by any kind of current collecting device, such as the plow shown in Figs. 1 and 3. Inasmuch as these electrical features form no part of my invention, I have not deemed it necessary to describe them in detail.

It will be observed that each motor, with all its gearing and clutches, is mounted independently of the frame of the locomotive, to which it is connected only by the springs 21 which give an elastic support for the outer end of the bracket 12 on which the mechanism is carried.

In connection with each motor a powerful brake is installed, and as during operation the motors will be geared either to the axles or to the cog wheels, the truck wheels 11 are not provided with any brake rigging. The motor brake is shown in Figs. 1 and 2, but is seen to best advantage in Fig. 8. On the motor shaft is keyed a brake disk or drum 53 and to opposite sides thereof are applied the brake shoes 54 carried by the brake levers 55 which are pivoted at 56 upon a stationary bar 57 projecting from a frame 58 which supports a solenoid 59. The movable core of this solenoid is pivotally connected to the long arm of a bent lever 60 which is fulcrumed at 61 on one of the brake levers. A rod 62 connects the angle of this lever with the other brake lever, thus constituting a sort of toggle between the two levers. When the core of the solenoid drops, it actuates the bent lever and the rod in such a manner as to draw the two brake levers toward each other and thereby apply the brake shoes to the drum. The winding of the solenoid is in circuit with the motor, so that when the current is turned on to energize the motor windings, the solenoid will lift its core and thereby release the brakes. But should the motor current be shut off, either intentionally or accidentally, the core will instantly drop by gravity and its weight will exert a powerful leverage upon the brake levers to stop the motor and the locomotive. This action occurs simultaneously on both motors. In addition to this automatic brake, I provide means for applying the brakes manually in order to supplement the action of the automatic feature, and to regulate and stop the machine whenever desirable. An upright shaft 63, provided with a hand wheel 64, has attached to it one end of a chain 65, which runs under a stationary pulley 66, up over a pulley 67 on one end of an elbow lever 68 pivoted to one of the brake levers, and thence under a stationary pulley 69 to the opposite end of the locomotive. The elbow lever 68 has its other arm connected by a rod 70 to the other brake lever, the rod being preferably adjustable in length as shown. The lever 68 and rod 70 constitute a sort of toggle connecting the brake levers. A spring 71 tends to lift the arm carrying the pulley 67 and thus hold off the brake shoes. When the brake staff is turned, it winds up the chain and pulls down the pulley 67, thereby urging the brake levers 55 together and applying the brake shoes to the drum. In this way, the engineer can add hand power to the effect of the electric brake and produce a greater braking action, without interfering with the automatic operation of the solenoid.

As appears in Fig. 2, the brake levers 55 are double, only the rear member of each being shown in Fig. 8. This avoids any bending strains on the pivots. The levers 60 and 68 and the rods 62 and 70, constituting the two toggle systems, are located between the two members of each lever, as are also the brake shoes 54. The chain 65 extends from the pulley 69 to the similar point in the brake rigging of the motor at the other end of the locomotive, so that the operation of either of the brake staffs will apply both brakes simultaneously.

Passing now to the features which render the locomotive peculiarly adapted for towing purposes, it will be observed that the drum 72 on which the cable 73 is wound is located midway between the ends of the locomotive and above the upper member 3 of the side frames, so that the cable can be led off on either side of the machine and through a wide range of angles to the line of travel. The hub 74 of the drum is rotatably mounted upon the hub 75 of a spider 76 which in turn is rotatable upon the upper portion of a massive tubular, vertical cylindrical column 77 rising from a pedestal 78 secured to the base plate 79 which is supported upon the lower members 4 of the side frames. The upper portion of the pedestal is held in a brace 80 which is shown as a heavy X-shaped casting fastened to the upper members 3 of the side frames and to two of the cross beams 2. This brace fits the pedestal just below the shoulder 81 on which the hub 75 is stepped.

The spider 76 supports a circular rim 82 which has a horizontal upper surface 83 and a dependent flange 84. On the surface 83 is secured a flat, smooth bronze ring 85, on which lies a smooth flat ring 86 of steel. A second bronze ring 87, similar to the first, lies on top of the steel ring and is secured to a flanged follower 88. Studs 89 project up from the rim 82 through holes in a horizontal flange of the follower and are encircled by springs 90 which abut between said flange and nuts 91 on the studs and press all three rings tightly together. The steel ring 86 is secured to lugs 92 on a flange 93 projecting downwardly from the winding drum 72, so that the rings constitute a friction clutch between the spider and the drum.

Inside the flange 84 on the spider is secured a large internal gear 94, with which mesh two driving pinions 95, 96, secured respectively to two upright shafts 97, 98. Step bearings 99, 100 are provided for these shafts in the base of the pedestal 78, while arms 101, 102 projecting from the upper portion of the pedestal just below the brace 80 afford guide bearings 103, 104 for the upper portions of said shafts. A worm gear 105 is clutched to the shaft 97 and is driven by a worm 106 on the shaft of an electric motor 107 bolted to the base 79 of the locomotive. This gearing is inclosed by a casing 108. A bevel gear 109 is keyed to the upright shaft 98 and meshes with a bevel pinion 110 on the shaft of an electric motor 111 fastened to the base 79.

The motor 111 is used for driving the drum at a fast rate of speed for coiling in or paying out cable. It remains permanently in gear. The other motor, 107, is used for taking in or paying out cable when it is under load, and the drum operates as a windlass or capstan. It operates much more slowly and powerfully than the motor 111, and can be disconnected from its shaft when not in use. To this end, a clutch is provided, having one member 112 splined to the shaft 97, and the other member 113 attached to the hub 114 of the worm gear, which is sleeved on the shaft. A lever 115, fulcrumed to a lug 116 on the arm 101, is pivotally connected to the hub of the clutch member 112, and its other end is attached to the movable core of a solenoid 117 which is in circuit with the motor 111, so that whenever the circuit of the latter is closed the solenoid will lift its core and the lever 115, and thus throw out the clutch of the slow winding motor, allowing shaft 97 to revolve but motor 107 and worm gear 105 remaining at rest.

The cable guide which directs the cable as it pays out or winds up is mounted to revolve on the axis of the drum. It comprises two angularly adjustable portions 118, 119, the former being a circular bell which serves as a cover or cable guard for the winding drum. The hub 120 of the bell is journaled on the upper end of the column 77, being stepped on a shoulder thereon. At one side the bell is cut away to admit the cable to the drum. On each side of this opening is bolted one end of a frame, comprising box-like ends 121 connected by two parallel bars 122, one above and the other below said opening. Between said bars and on either side of the opening are two upright guide rolls 123 having cylindrical faces, and rotating on journals received in bearings in the bars 122. At each end of this frame, arms 124 extend downwardly to afford supports for two rollers 125 mounted on horizontal studs 126 secured in said arms. These rollers are adapted to travel between the upper and lower flanges of a circular channel iron 127 which is fastened on top of the side frames concentric with the column 77, and forms a track supporting the outer end of the frame 121, 122, and relieving the column 77 of the weight thereof. Stops 128 are removably attached to the top of the channel iron 127 to limit the angular play of the guide member 118. By taking off these stops, the bell can be turned until the rolls 123 are on the opposite side of the locomotive; after which the stops can be secured on that side to limit the movement of the bell. The other guide member 119 is a radial casting having one end turning freely on the hub of the member 118. A cap 129, removably secured to the top of the column 77, protects the joint and prevents the guide members from accidentally coming off. The outer end of the member 119 is an upright rectangular frame 130 in whose top and bottom is journaled on a vertical axis a swivel 131 carrying two grooved rolls 132, journaled one above the other on horizontal axes. The edges of these rolls stand close together, so that their grooves form an opening through which the cable 73 passes, about on a line with the middle of the guide rolls 123. The frame 130 is supported by rollers 133 running in the track 127. The guide member 119 has an angular movement with reference to the member 118, limited by the frame 130 striking the ends of the frame 121. When the cable is pulled either forward or backward from the middle position it occupies in Fig. 1, the swivel permits the grooved rolls 132 to move with it, and the guide member 119 swings also, so that the rolls 132 continue to support the rope on a line with the middle of the rolls 123, without being themselves subjected to any side strain. All lateral strains are sustained by the heavy guide rolls 123; the cable moving up and down between them as it winds on the drum. It will be observed that the latter is in the form of a deeply grooved wheel, the groove 134 being U-shaped. It is found that the cable lays itself up in a solid regular coil in this groove, so that it can withstand a heavy pull without jamming.

In order to guide for lateral motion thrust wheels 136 are provided, which are arranged between each pair of wheels 11 and engage opposite sides of rack rail 135. The gripping wheels are carried on heavy bars 137 whose inner ends are pivoted at 38 to the base of the machine, so that said bars can move horizontally. Their outer ends are engaged by strong springs 139 which urge said gripping wheels to its inner limit of travel.

This locomotive has a number of features which have made it a practical success. It is constructed on accepted lines of locomotive practice. The parts are all simple and sturdy and designed to meet and sustain heavy duty. Each propelling motor and its gearing is mounted on a rigid bracket separate from the locomotive frame, supported at one end directly on the wheel axle and spring-mounted at the other end resulting in smooth and easy running. The controlling mechanism, both mechanical and electrical, is duplicated in the two cabs, so that the locomotive can be handled from either end; both of the brake riggings and clutch mechanisms being mechanically connected, respectively. The winding drum and guide members are on top of the locomotive in full view from both cabs. The friction rings which constitute the clutch between the driving spider and the cable drum, are machined and ground to a smooth fit, and by means of the compression springs they can be set to slip at any desired load on the cable up to the breaking strain of the same. When adjusted for a given load, the drum can be relied upon to slip within five per cent. of that load. This always will prevent the cable from breaking as the strain is limited by this device. This device is also necessary when a tow is too heavy to be accelerated at locomotive speed, and it allows the cable to slip out until the speed of the tow increases to that of the locomotive.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:—

1. An electric towing locomotive having a single axle near each end, a bracket hinged on each axle independently of the locomotive frame and extending toward the end of the locomotive, a propelling motor mounted on each bracket, and speed reducing gearing supported by said bracket.

2. An electric towing locomotive having parallel side frames whose bottom members slope upward at the ends, cross beams connecting said frames, pedestals at the points where the upward slope of the side frames begins, a single axle journaled in each pair of pedestals, a bracket hinged on each axle independently of the side frames, and extending toward the end of the locomotive, a motor mounted on each bracket, speed-reducing gearing carried on the bracket, and spring suspension devices between the outer end of the bracket and the frame.

3. An electric towing locomotive having single axles near its ends, a pinion keyed to each axle, a sleeve on each axle provided with a cog wheel and a gear wheel, a bracket hinged on the axle, a motor mounted on the bracket, a speed-reducing gearing on the bracket engaging the pinion on the axle and the gear wheel sleeved thereon, and clutches for connecting the motor to either the pinion or the gear wheel.

4. An electric towing locomotive having driving axles near its ends, a bracket hinged on each axle, a motor mounted on said bracket, a jack-shaft geared to the motor, a cog wheel sleeved on the axle, and means for causing the jack shaft to actuate either the driving axle or the cog wheel at will.

5. An electric towing locomotive, having a driving axle near its end, a bracket hinged thereon, a motor mounted on said bracket, a jack shaft geared to the motor, gears loose on said shaft, a pinion on the axle meshing with one of said gears, a sleeve on the axle carrying a cog wheel and a gear wheel, the latter meshing with the other loose gear on the jack shaft, clutches for coupling said loose gears to the jack shaft, and means for simultaneously rendering one of said clutches operative and the other inoperative respectively.

6. An electric towing locomotive having a propelling motor, a jack shaft geared to said motor and having an axial passage through it, gear wheels loose on said shaft, clutches for coupling said wheels to the shaft, a rod passing through said passage for operating one of said clutches, a lever pivoted to said rod, connections between said lever and the other clutch, means for rocking said lever, a driving axle having a pinion meshing with one of said loose gears, and a sleeve on the axle geared to the other loose gear and carrying a cog wheel.

7. An electric towing locomotive having a propelling motor, a jack shaft geared to said motor, loose gears on said shaft for transmitting power to the propelling wheels of the locomotive, clutches for coupling said gears to the jack shaft, a lever for operating said clutches, a rock shaft, and a resilient arm on said shaft engaging said lever.

8. An electric towing locomotive having a propelling motor, a brake drum on the shaft of said motor, brake levers on opposite sides of said drum, a bent lever pivoted to one brake lever, a rod connecting the bent lever to the other brake lever, a solenoid for actuating said bent lever, and means for applying the brake by hand in addition to the action of the solenoid.

9. An electric towing locomotive having a propelling motor, a brake drum on the motor shaft, brake levers on opposite sides of said drum, two systems of toggle-levers connected to said brake levers, electrical means for actuating one of said systems automatically to apply the brake when the motor circuit is opened, and manual means for operating the other system to assist the electric application.

10. An electric towing locomotive having a propelling motor, a brake drum on the motor shaft, brake levers coöperating with said drum, two systems of toggle levers connected to said brake levers, electrical means for actuating one of said systems automatically to apply the brake when the motor circuit is opened, a brake staff having a hand wheel, a chain attached to said staff, and a pulley on one of the levers of the other toggle system around which said chain passes.

In witness whereof, I have hereunto set my hand this 27th day of October, 1914.

CARL W. LARSON.

Witnesses:
 HELEN ORFORD,
 MARGARET E. WOOLLEY.